Figure 1:
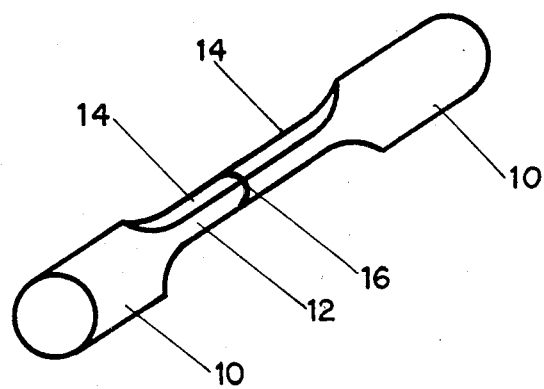

United States Patent [19]

Jahnke

[11] 4,409,462
[45] Oct. 11, 1983

[54] PROCESS FOR THE NON-CRACKING ENERGY BEAM WELDING OF HIGH TEMPERATURE SHAPED PARTS

[75] Inventor: Bernd Jahnke, Neckargemünd, Fed. Rep. of Germany

[73] Assignee: BBC Brown, Boveri & Company, Limited, Baden, Switzerland

[21] Appl. No.: 292,007

[22] Filed: Aug. 11, 1981

[30] Foreign Application Priority Data

Aug. 13, 1980 [DE] Fed. Rep. of Germany ....... 3030532

[51] Int. Cl.$^3$ ............................................. B23K 15/00
[52] U.S. Cl. ...................... 219/121 ED; 219/121 EM; 219/121 LD; 219/121 LM
[58] Field of Search ................. 219/121 EC, 121 ED, 219/121 EB, 121 EM, 121 LC, 121 LD, 121 L, 121 LM

[56] References Cited

U.S. PATENT DOCUMENTS

| | | | |
|---|---|---|---|
| 3,617,685 | 11/1971 | Brill-Edwards | 219/121 ED |
| 3,975,612 | 8/1976 | Nakazaki et al. | 219/121 ED |
| 3,999,030 | 12/1976 | Nakazaki et al. | 219/121 ED |
| 3,999,031 | 12/1976 | Yonezawa et al. | 219/121 ED |
| 4,288,677 | 9/1981 | Sakata et al. | 219/121 ED |

OTHER PUBLICATIONS

Sims, et al., The Superalloys, Interscience Publication, pp. 530–532, 598, 599, 1972.

*Primary Examiner*—C. L. Albritton
*Attorney, Agent, or Firm*—Bruns, Doane, Swecker & Mathis

[57] ABSTRACT

In order to join by welding shaped parts, in particular, of cast superalloys based on nickel or cobalt, without cracking, by means of a beam of energy, preferably an electron beam, according to the invention the weld zone and an adjacent area of adequate size, often the entire part, are heated to a preheat temperature between 1000° to 1250° C., preferably between 1070° and 1180° C., and maintained at this temperature at least until the temperature is at least extensively equalized. The weld surfaces in contact with each other are then melted and welded together by means of the energy beam. Subsequently, the weld zone and the adjacent area are cooled uniformly.

In this manner, a welded joint is obtained having mechanical properties that are equal to or only slightly reduced compared to those of the initial material and containing no pores or cracks.

The process according to the invention is particularly suitable for the production or repair of hot parts of gas or steam turbines, such as, for example, turbine blades and/or turbine housings.

8 Claims, 2 Drawing Figures

U.S. Patent  Oct. 11, 1983  4,409,462

PROCESS FOR THE NON-CRACKING ENERGY BEAM WELDING OF HIGH TEMPERATURE SHAPED PARTS

The invention concerns a process for the non-cracking energy beam welding of heat-resistant shaped (preferably cast) parts of nickel-or-cobalt based superalloys.

Formed parts of such superalloys containing welds, because of their composition, have a strong tendency to crack in the area of the weld joint, so that they cannot be welded without the use of additional measures. It is known to place a thin steel insert with a high iron content between the surfaces to be welded together. Even though this makes it possible to effect an essentially crack-free joint, there remains the risk of a loss of strength and, due to the difference of the composition of the materials of the insert and the shaped parts, the weld itself often has an undersirable composition. This is a disadvantage in particular in the welding of highly stressed shaped parts of turbines exposed to high thermal and corrosive stresses, such as, for example, turbine housings and turbine blades of gas turbines, such parts being designated as the hot parts of turbines.

It is therefore the object of the invention to develop a process of the above-mentioned type so that crack-free joints may be effected, said joints having mechanical properties and corrosion resistance identical with or differing only slightly from those of the shaped parts and wherein the composition of the joint is the same or essentially the same as that of the parts. Furthermore, the process should be capable of a simple and thus cost effective application.

These objects are attained according to the invention by heating the weld zone and an adjacent area of adequate magnitude to a preheat temperature between 1000° and 1250° C., in particular, between 1070° and 1180° C., maintaining said zone and said area at least until the temperature is equalized or to the very least until it is extensively equalized within the weld zone and the adjacent area, the welding surfaces in contact with each other are melted and welded together by means of the energy beam and that the weld zone and the adjacent area are subsequently cooled in a uniform manner.

The shaped parts may therefore be welded together without filler materials by means of an energy beam, preferably an electron beam, while filler materials may be added, if desired, to achieve optimum properties of the welded joint. The uniform heating of the parts to be welded results in the elimination of cracks of pores. It has been found that a preheating period of approximately 10 to 30 min., preferably 20 min., is adequate in most cases. The preheated area must be large enough to prevent the occurrence of detrimental structural changes in its boundary areas during heating and cooling. In view of this, it is necessary in many cases to heat the entirety of the shaped parts to the preheat temperature.

The uniform cooling of the weld zone and the adjacent area is of equal importance, after welding to the uniform temperature before welding.

As shown by investigations of welds effected by the process according to the invention, the welds and their vicinity, after cooling and possibly after the heat treatments specified by the manufacturer of the materials, such as, for example, aging, are free of cracks and pores, and the yield strength and fatigue strength of the initial material is attained.

In order to safely prevent the formation of cracks and structural changes it is recommended according to a particularly preferred further development of the invention to heat the shaped parts in their entirety to the preheat temperature.

If the parts are formed of a material for which the manufacturer specifies a solution anneal, the parts are advantageously heated to a preheat temperature that is not more than 30° C. under the temperature of the solution anneal. Higher values are naturally permissible.

It is obvious that the heating cannot be continued to temperatures that are arbitrarily high. Limits are set by the melting temperature (solidus temperature) of the shaped parts which must not be reached during heating. It is preferable that a range of approximately 100° C. above the temperature of the solution anneal should not be exceeded.

The parts are preferably cooled in accordance with the specifications provided by the manufacturer of the material for the cooling after solution annealing. This assures that no deterioration of the mechanical properties of the parts will take place. Simultaneously, a further advantage is obtained by virtue of the fact that the solution anneal specified for cast parts in many cases may be replaced by the heat treatment during the welding process, thereby substantially reducing total costs.

The concept of a solution anneal signifies an annealing heat treatment at a temperature slightly above the solubility line of a precipitation hardenable alloy. The corresponding solution anneal temperature varies from material to material and is specified by the manufacturers of such materials. The conditions of cooling the parts to room temperature after solution annealing are similarly specified, in order to prevent changes in mechanical properties.

Representative superalloys that may be welded with the process according to the invention contain 5 to 24% chromium, up to 11% molybdenum, up to 2% niobium, tantalum and niobium up to 7%, cobalt to 22%, titanium to 6%, aluminum to 7%, carbon 0.01 to 0.5%, beryllium 0.001 to 0.2%, zirconium to 0.3%, hafnium to 2%, iron to 6% and tungsten to 12% (all in weight %), balance nickel.

The above-mentioned materials are preferably brought to a preheat temperature of 1080° to 1180° C. and then welded. The cooling of the welded parts must take place in accordance with the specifications of the manufacturer in still air at room temperature, in order not to alter the mechanical properties of the material. If necessary, further heat treatments are to precede the cooling process, for example, aging, which is effected mostly at a temperature of 850° C.

If parts with different solution anneal temperatures are to be joined by welding, it is advantageous to base the determination of the preheat temperature on the higher of the solution anneal temperatures. It is self evident that the above-specified general guidelines for the selection of these temperatures must be observed.

If the parts to be joined by welding are provided with different specifications concerning their cooling, possibly after solution annealing, the specification containing the more rigorous conditions should be selected for the cooling of the weld zone and the adjacent area. As a rule, this will consist of the specification prescribing a slower cooling rate.

The process according to the invention is suitable for the welding of shaped parts of any kind, but is particularly intended for the joining of hot parts, in particular, of gas turbines, for production or repair purposes. Thus, head and/or root parts may be fastened advantageously to turbine blades. A further substantial field of application consists of repairs to such hot parts. Cracks may be welded shut without the loss of mechanical strength and damaged turbine blades may be repaired satisfactorily by the insertion by welding of newly fitted parts.

Figure 2:
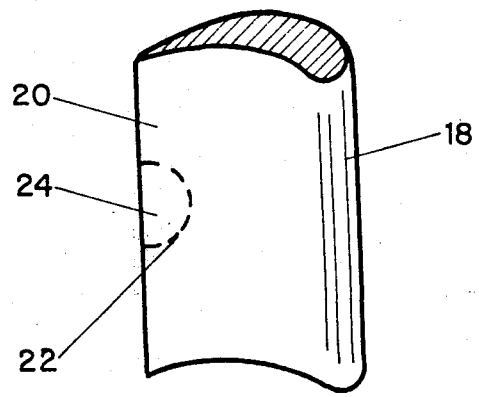

Further advantages and characteristics of the invention will become apparent from the description hereinbelow of examples, together with the schematic drawings. In the drawings:

FIG. 1 shows a specimen rod welded by the process according to the invention, in a perspective view and FIG. 2 the section of a turbine blade in a perspective view, wherein in the area of the trailing edge a shaped part has been inserted by the process of the invention.

Specimen rods were prepared in the form according to FIG. 1, from a material containing 0.05 to 0.15% carbon, 0.5% silicon, 0.5% copper, 0.5% iron, 0.2% manganese, 0.6 to 1.1% niobium, 15.5 to 16.5% chromium, 3.2 to 3.7% titanium, 3.2 to 3.7% aluminum, 8.0 to 9.0% cobalt, 1.5 to 2% molybdenum, 0.015% sulfur, 2.4 to 2.8% tungsten, 1.5 to 2% vanadium, 0.15% phosphorous and the rest nickel. Total length was 120 mm, the diameter of the cylindrical end parts 10 was 16 mm. Between the end parts 10, the specimens had a flat area 12, having a thickness of 7 mm. In this area 12, the specimens were cut into two halves 14 transversely to their longitudinal axis and subsequently rewelded.

For this purpose, the halves 14 were heated in an annealing furance to 1140° C. and maintained at this temperature for 20 min., to obtain uniform heating throughout each of the two halves. Following the abutting of the weld surfaces 16, the two halves were welded together by means of an electron beam. The beam output was 0.7 KW, with a welding velocity of 20 mm per sec. The welding was effected in a conventional manner in vacuum, but laser welding under an inert gas atmosphere would also be used.

Since the manufacturer of the alloy material of the specimens specifies cooling is still air at room temperature after solution annealing, the specimens were cooled under these conditions, with subsequent aging for 24 h. at 850° C.

Testing of the mechanical properties of the specimens at 850° C. yield the representative values compiled in the table hereinbelow:

|  | Yield Strength N/mm$^2$ | Tensile Strength N/mm$^2$ |
|---|---|---|
| Base material | 538 | 714 |
| Welded part | 544 | 656 |

This result should be considered very good, particularly if it is noted that according to the applicant's own investigations, the tensile strength of the base material has a scatter range (deviation) of ±50 to 70 N/mm$^2$.

The fatigue strength of the welded specimens again was also the scatter range determined for the base material. According to the applicant's own measurements during alternating stressing (tension-compression) with a load amplitude of approximately 160 N/mm$^2$ and a frequency of 10 Hertz, it takes approximately $1.5 \times 10^6$ load cycles to fracture of the base material. For the welded specimens under similar conditions approximately $3.8 \times 10^5$ to $9 \times 10^5$ cycles are required for fracture. This result may again be considered very good, as the scatter range for the fatigue strength under the above-mentioned alternating load of the base material is between approximately $1 \times 10^5$ and $2 \times 10^6$ cycles.

As a result of the preheating of the shaped parts to the above-cited temperatures, very small temperature differences are experienced during welding. Investigations found a temperature graident of only approximately 50° C./mm adjacent to the weld zone. The corresponding temperature gradient difference during welding with a preheat temperature of 20° C. amounts of about 500° C./mm.

The small differences in temperature between the welded parts lead to the formation of a fine grained solidification structure of the weld, with the corresponding favorable mechanical properties.

Metallurgical examinations of the weld zone show no cracks or pores, but a weld with an optimum solidification structure.

FIG. 2 shows a section of a turbine blade 18 in a perspective view. The trailing edge 20 has been damaged; the damaged area is therefore cut in the shape of a semicircle and a corresponding replacement part 24 fitted in.

As the turbine blade 18 and the replacement part 24 are made of a superalloy material containing 0.15% carbon, 22.4% chromium, 19.0% cobalt, 2.0% tungsten, 1.0% niobium, 1.4% tantalum, 3.7% titanium, 1.9% aluminum, 0.1% zirconium, 0.009% boron and the balance nickel and has a solution annealing temperature around 1160° C., heating to 1180° C. is effected and maintained for approximately 20 min. for uniform heat saturation. Following the fitting of the surface to be welded against each other, welding is performed with an electron beam having a maximum beam intensity of 1.0 KW, with a welding rate of 20 mm/sec. Maximum blade thickness: 20 mm.

As in the example of FIG. 1, the electron beam passes in the direction of the surfaces to be welded transversely through the parts. Since the thickness of the weld varies with the profile of the turbine blade, the beam intensity is adjusted to this thickness variation and the beam guided on a helical path to obtain favorable welding conditions.

After the welding, the blade is aged in accordance with the specifications of the material manufacturer and cooled in still air of room temperature. Subsequent structural examinations confirmed the expectations: no cracks or pores were found in the weld area.

The material described hereinabove having the nominal composition from which the specimen rods of FIG. 1 are prepared, is known by the designation IN 738 LC and has a solution annealing temperature of 1120° C.

The hardness of the welded specimens is uniform. Hardness measurements transverse to the weld yields, both in the area of the weld and in the adjacent areas a Vickers hardness (HV) remaining constantly between the values of 485 HV 0.1 and 515 HV 0.1.

The material of the turbine blade according to FIG. 2, the nominal composition whereof has been given hereinabove, is known as IN 939.

All of the precentage data given in connection with the material compositions are by weight.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. Process for the crack-free energy beam welding of temperature resistant shaped parts, made of nickel and cobalt-based superalloys containing 5 to 24% chromium, up to 11% molybdenum, up to 2% niobium, tantalum and niobium up to 7%, up to 22% cobalt, up to 6% titanium, up to 7% aluminum, 0.01 to 0.5% carbon, 0.001 to 0.2% beryllium, up to 0.3% zirconium, up to 2% hafnium, up to 6% iron and up to 12% tungsten, balance nickel (all percentages by weight), characterized in that the weld zone and an adjacent area are heated to a preheat temperature of between 1070° to 1180° C. and maintained at said preheat temperature until the temperature has been at least extensively equalized within the weld zone and the adjacent area, the abutting weld surfaces in contact with each other are melted and welded to each other by means of an energy beam, and the weld zone and the adjacent area are subsequently cooled in a uniform manner.

2. Process according to claim 1, characterized in that the shaped parts are heated to the preheat temperature in their entirety.

3. Process according to claim 1, wherein the said shaped parts are cast parts.

4. Process according to claim 1 or 2, characterized in that parts made of a material for which solution annealing is specified, are heated to a preheat temperature not lower than 30° below the solution annealing temperature.

5. Process according to claim 4, characterized in that the weld zone and the adjacent area are cooled according to the specifications of the material manufacturer for cooling after solution annealing.

6. Process according to claim 5, characterized in that the shaped parts are made of superalloy materials having different solution annealing temperatures and the higher of said solution annealing temperatures is used.

7. Process according to claim 6, characterized in that the shaped parts are made of superalloy materials having different cooling specifications and the weld zone and the adjacent area are cooled in keeping with the stricter of said specifications.

8. Process of claim 1, wherein the shaped parts are hot parts of turbines for manufacturing or repair purposes.

* * * * *